(12) United States Patent
Ujimoto et al.

(10) Patent No.: US 9,285,823 B2
(45) Date of Patent: Mar. 15, 2016

(54) SHIFTING STRUCTURE

(71) Applicant: DELTA KOGYO CO., LTD., Hiroshima (JP)

(72) Inventors: Takushi Ujimoto, Hiroshima (JP); Mizuho Ueta, Hiroshima (JP); Koichiro Hamaka, Hiroshima (JP); Takumi Kusayama, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 179 days.

(21) Appl. No.: 14/069,865

(22) Filed: Nov. 1, 2013

(65) Prior Publication Data

US 2014/0137697 A1   May 22, 2014

(30) Foreign Application Priority Data

Nov. 16, 2012 (JP) ................. 2012-252461

(51) Int. Cl.
*G05G 1/06* (2006.01)
*F16H 59/02* (2006.01)

(52) U.S. Cl.
CPC .............. *G05G 1/06* (2013.01); *F16H 59/0278* (2013.01); *F16H 2059/0282* (2013.01); *Y10T 74/20612* (2015.01)

(58) Field of Classification Search
CPC ............................... G05G 1/06; F16H 59/0278
USPC .......................................................... 74/523
See application file for complete search history.

(56) References Cited

U.S. PATENT DOCUMENTS

| | | | | |
|---|---|---|---|---|
| 5,588,329 A | * | 12/1996 | Nedachi | ...................... 74/473.36 |
| 6,058,797 A | * | 5/2000 | Konig et al. | ...................... 74/523 |
| 8,468,906 B2 | * | 6/2013 | Shioji | ..................... B60K 20/04 74/473.1 |
| 9,016,969 B2 | * | 4/2015 | Yang | ......................... F16B 3/04 403/109.2 |
| 9,032,829 B2 | * | 5/2015 | Ujimoto | ..................... F16H 9/10 74/473.23 |
| 2006/0070482 A1 | * | 4/2006 | Steele | ............................. 74/523 |
| 2011/0126656 A1 | * | 6/2011 | Na | .......................... B60K 20/04 74/473.3 |

FOREIGN PATENT DOCUMENTS

| | | |
|---|---|---|
| DE | 101 59 642 | 6/2003 |
| DE | 10 2009 040162 | 3/2011 |

(Continued)

OTHER PUBLICATIONS

EPO Machine Translation of JPH096452 (A), Masaya, Oct. 1997.*

(Continued)

*Primary Examiner* — Vinh Luong
(74) *Attorney, Agent, or Firm* — Gerald E. Hespos; Michael J. Porco; Matthew T. Hespos

(57) ABSTRACT

Provided is a structure for installing a shift knob to a shift lever in which a rod is provided in an upwardly and downwardly movable manner. The shift knob comprises: a button capable of being manually pushed to allow the rod to be moved downwardly from a lock position to a lock release position; a core installing the button and having a lower tubular portion; and a cover ring covering the lower tubular portion of the core. The structure is configured to allow the cover ring to be fitted onto the lower tubular portion of the core, and thereby locked by the lower tubular portion of the core in a snap fit manner, and to allow the shift lever to be inserted into the lower tubular portion of the core, and thereby locked by the lower tubular portion of the core in a snap fit manner.

2 Claims, 11 Drawing Sheets

(56) References Cited

FOREIGN PATENT DOCUMENTS

| EP | 1 004 800 | 5/2000 |
| EP | 1 143 321 | 10/2001 |
| JP | H09 6452 | 1/1997 |
| JP | 2006-219003 | 8/2006 |
| WO | WO 2011/051583 A1 * | 5/2011 | ............... G05G 1/06 |

OTHER PUBLICATIONS

EPO Machine Translation of EP1143321, Netzker et al., Oct. 2001.*
European Appl. No. 13 191 904.5—extended European Search Report—Issued Jun. 9, 2015.

* cited by examiner

FIG. 4A
FIG. 4B
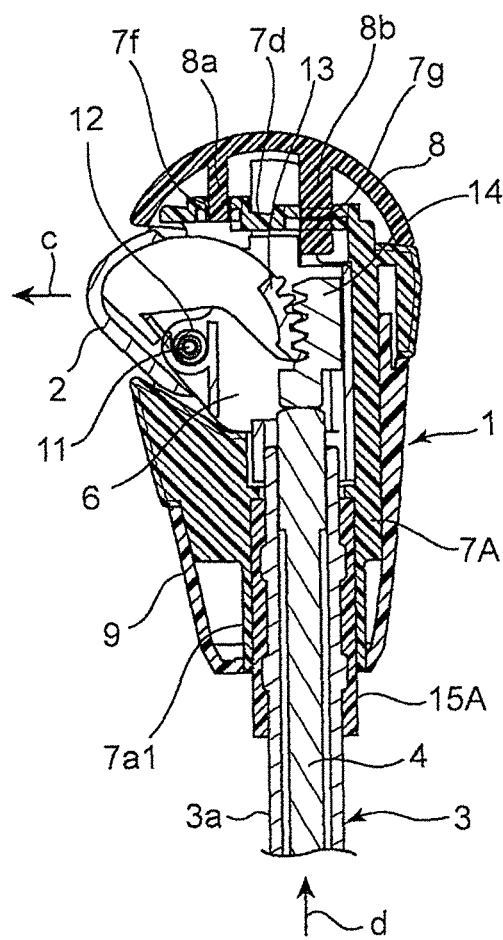
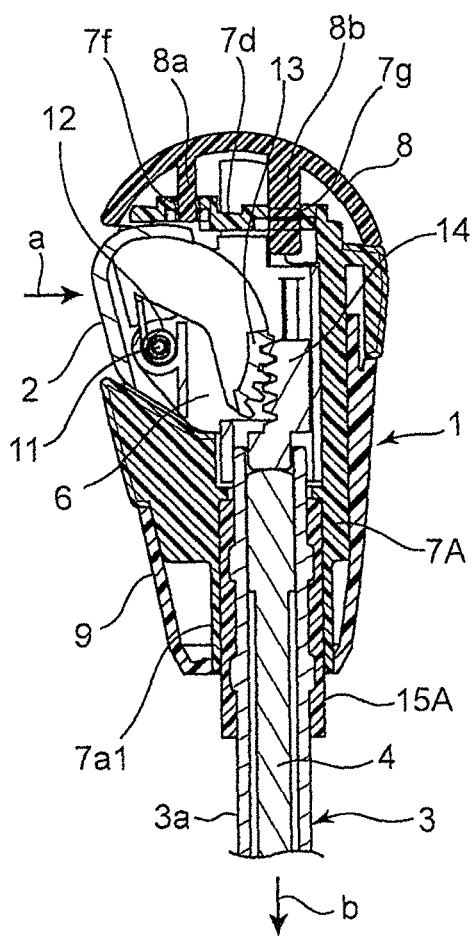

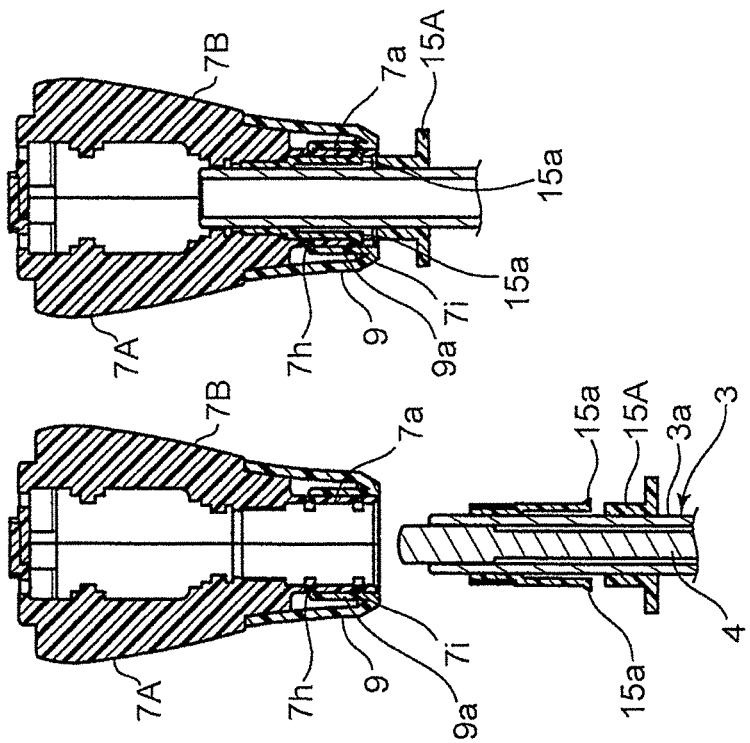

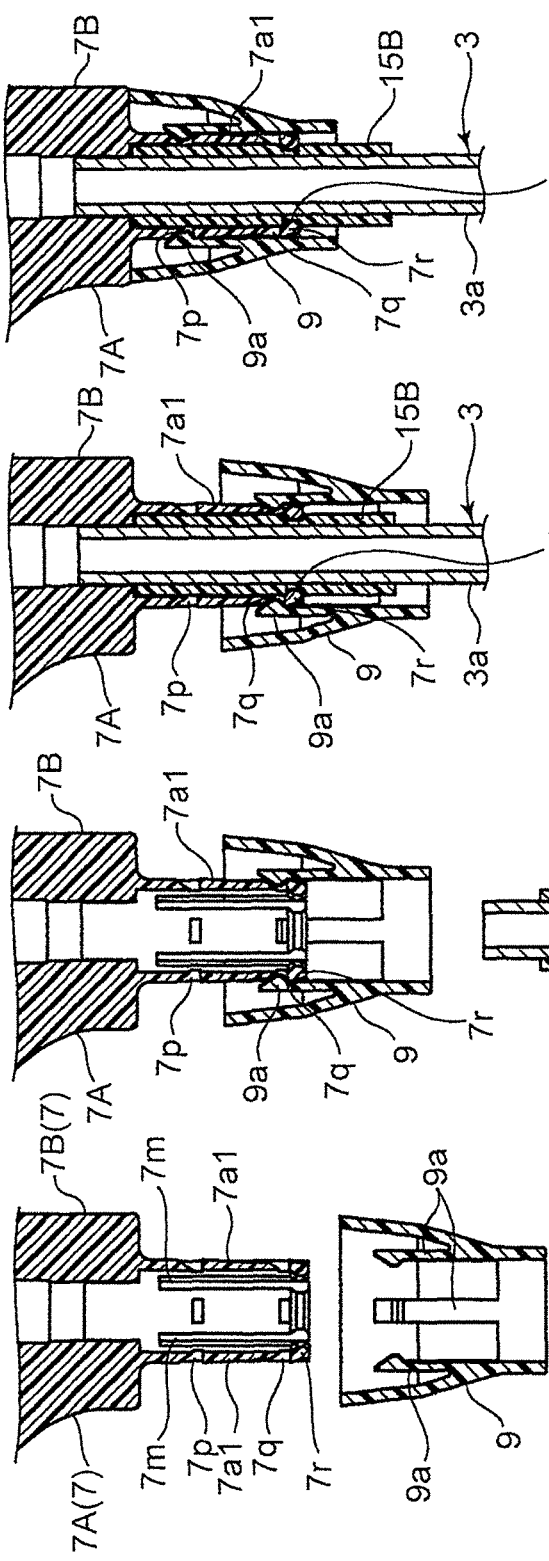

SHIFTING STRUCTURE

BACKGROUND OF THE INVENTION

1. Field of the Invention

The present invention relates to a shift knob installation structure.

2. Background Art

Heretofore, an automobile transmission shift lever device has been known as disclosed, for example, in JP 2006-219003A. As illustrated in FIG. 11, this type of shift lever device is configured such that, when a button 21 of a shift knob 20 is manually pushed and set to a push mode (pushing operation), a rod (not illustrated) is moved to a shift-lock release position, and, then when the button 21 of the shift knob 20 is manually released from the push mode (push-mode releasing operation), the rod is moved to a shift-lock position.

The shift lever device disclosed in the JP 2006-219003A employs a structure in which a guide protrusion 20a of the shift knob 20 is fitted in a guide groove 25a of the shift shaft 25 of the shift lever. In a shift knob installation process, the guide protrusion 20a of the shift knob 20 is inserted into the guide groove 25a downwardly from the side of an upper end of the shift shaft 25 of the shift lever. Then, when locking grooves 20b, 25b formed, respectively, in the shift knob 20 and the shift shaft 25 of the shift lever are aligned with each other, a pin 26 having spreadable legs is lockingly fitted into the locking grooves 20b, 25b from a lateral direction. In this way, the shift knob 20 can be fixedly installed to the shift shaft 25.

However, the above shift lever device requires the operation of lockingly fitting the pin 26 from a lateral direction, in addition to the operation of attaching the shift knob 20 to the shift shaft 25 from therebelow. Thus, the above process is far from one-touch installation. Moreover, the above process includes operations to be performed from two different directions, which leads to a problem of an increase in process time. There is another problem that it is necessary to prepare the pin 26 as a separate component.

SUMMARY OF THE INVENTION

It is an object of the present invention to provide a shift knob installation structure capable of reducing a process time. That is, this object is to provide a shift knob installation structure capable of installing a shift knob in a one-touch manner by an installation process to be performed from one direction (up-down direction). It is another object of the present invention to provide a shift knob installation structure capable of reducing the number of components.

That is, this object is to provide a shift knob installation structure capable of eliminating a need for a pin or the like as a separate component.

According to one aspect of the present invention, there is provided a structure for installing a shift knob to a shift lever in which a rod is provided in an upwardly and downwardly movable manner, wherein the shift knob comprises: a button capable of being manually pushed to allow the rod to be moved downwardly from a lock position to a lock release position according to the pushing operation; a core installing therein the button and having a lower tubular portion; and a cover ring covering the lower tubular portion of the core, and wherein the structure is configured to allow the cover ring to be fitted onto the lower tubular portion of the core from therebelow, and thereby locked by the lower tubular portion of the core in a snap fit manner, and to allow the shift lever to be inserted into the lower tubular portion of the core from therebelow, and thereby locked by the lower tubular portion of the core in a snap fit manner.

BRIEF DESCRIPTION OF THE DRAWINGS

FIG. 4A is a sectional view of the shift knob, taken along the line IVA-IVA in FIG. 1, in a state when a button of the shift knob is in a push-mode release position.

FIG. 4B is a sectional view of the shift knob, corresponding to FIG. 4A, in a state when the button is in a push-mode position.

FIG. 6A illustrates a shift knob and a cover ring in a push type structure according to one embodiment of the present invention, in a state before the cover ring is attached to a lower tubular portion of a core.

FIG. 6B illustrates the shift knob and the cover ring in the push type structure, in a state just after the cover ring is attached to the lower tubular portion of the core.

FIG. 6C illustrates a shift lever, the shift knob and the cover ring in the push type structure, in a state before the shift shaft of the shift lever is inserted into the lower tubular portion of the core.

FIG. 6D illustrates the shift lever, the shift knob and the cover ring in the push type structure, in a state after the shift shaft of the shift lever is inserted into the lower tubular portion of the core.

FIG. 8A illustrates a shift knob and a cover ring in a pull type structure according to one embodiment of the present invention, in a state before the cover ring is fitted onto a lower tubular portion of a core.

FIG. 8B illustrates the shift knob and the cover ring in the pull type structure, in a state just after the cover ring is fitted onto a lower tubular portion of a core, and temporarily snap-fitted to an intermediate locking recess.

FIG. 8C illustrates a shift lever, the shift knob and the cover ring in the pull type structure, in a state just after the shift shaft of the shift lever is inserted into the lower tubular portion of the core, and snap-fitted to a lower locking protrusion.

FIG. 8D illustrates the shift lever, the shift knob and the cover ring in the pull type structure, in a state after the cover ring is snap-fitted to an upper locking recess.

DETAILED DESCRIPTION OF THE PREFERRED EMBODIMENTS OF THE INVENTION

The present invention will now be described in detail, based on an embodiment thereof with reference to the drawings.

Firstly, with reference to FIGS. 1 to 4B, a shift knob 1, primarily, a button structure thereof, in a shift knob installation structure according to one embodiment of the present invention, will be described.

Figure 1:
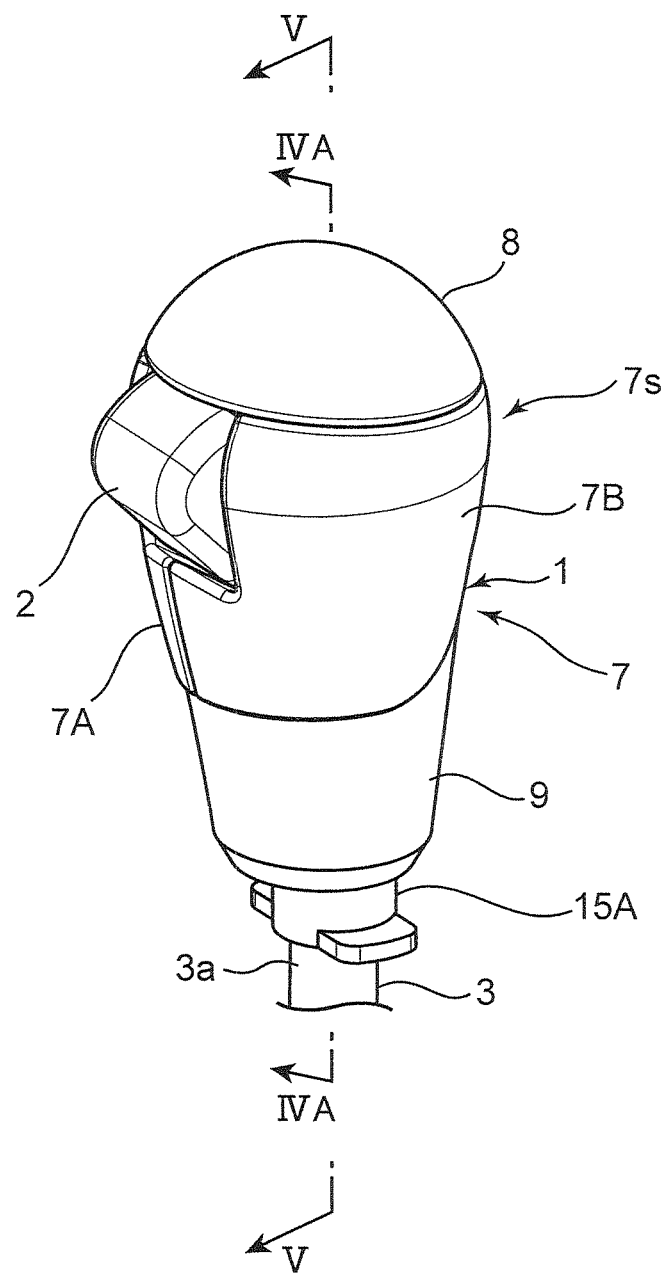
FIG. 1 is a perspective view of a shift knob in a shift knob installation structure according to one embodiment of the present invention.
Figure 2:
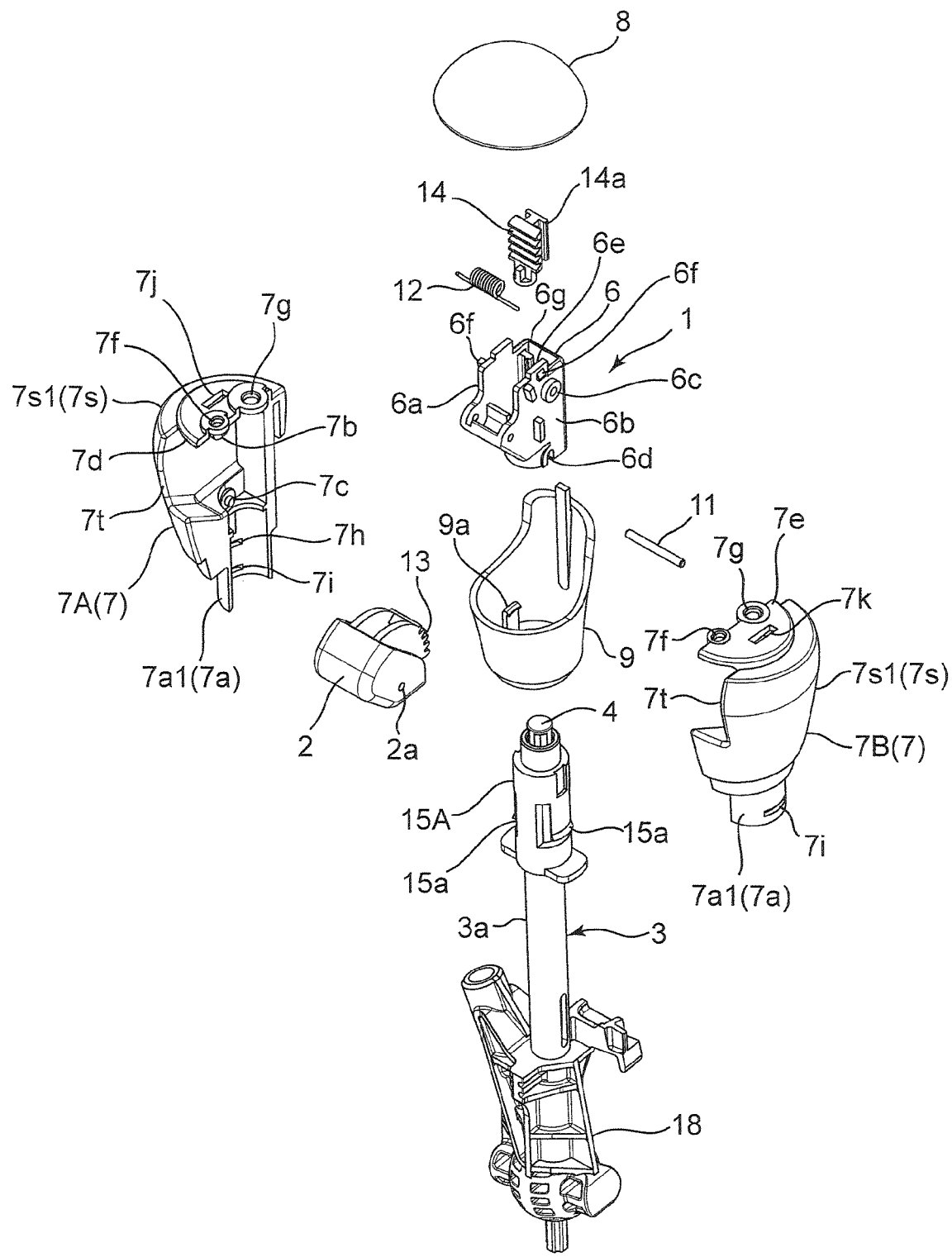
FIG. 2 is an exploded perspective view of the shift knob illustrated in FIG. 1.
Figure 3A:
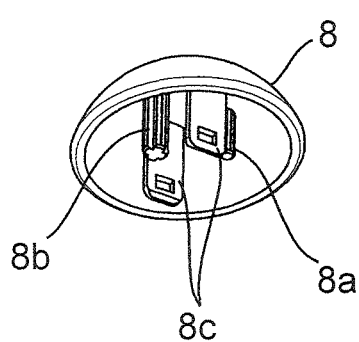
FIGS. 3A and 3B are perspective views of an ornament.
Figure 3B:
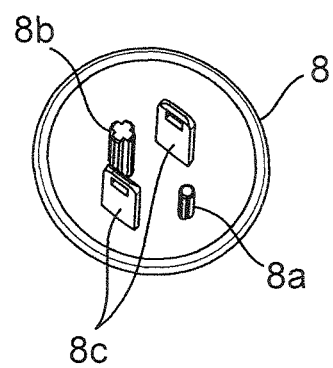
Figure 3C:
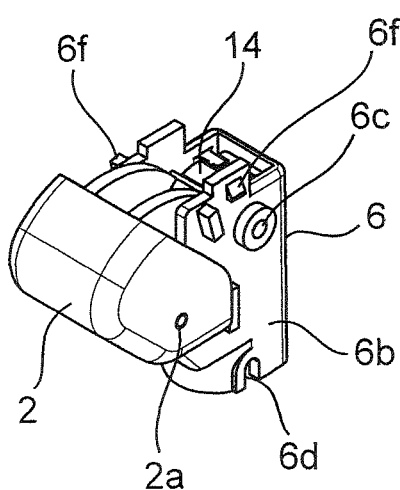
FIGS. 3C and 3D are perspective views of a button base.
Figure 3D:
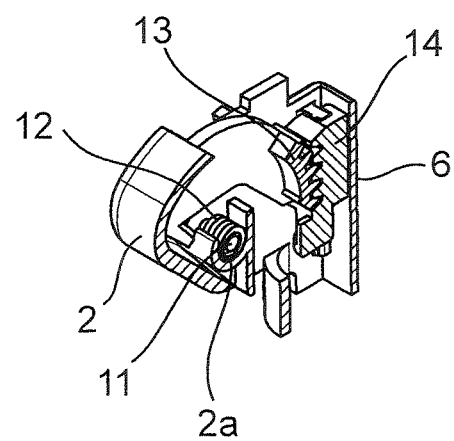
Figure 5:
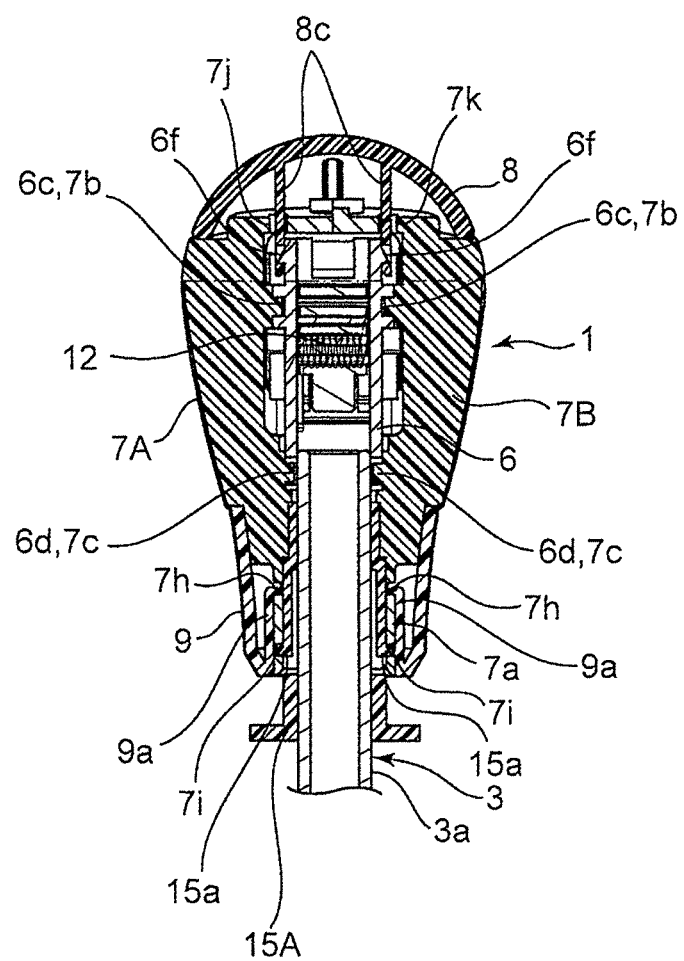
FIG. 5 is a sectional view of the shift knob, taken along the line V-V in FIG. 1.

FIG. 1 is a perspective view of the shift knob 1. FIG. 2 is an exploded perspective view of the shift knob 1. FIGS. 3A and 3B are perspective views of an ornament 8. FIGS. 3C and 3D are perspective views of a button base 6. FIG. 4A is a sectional view of the shift knob 1 in a state when a button 2 thereof is in a push-mode release position. FIG. 4B is a sectional view of the shift knob 1 in a state when the button 2 is in a push-mode position. FIG. 5 is a front sectional view of the shift knob.

A shift lever 3 is, for example, an automobile transmission shift lever. As illustrated in FIGS. 4A and 4B, a shift lever device using the shift lever 3 is configured such that, according to when the button 2 of the shift knob 1 is manually pushed and set to a push mode (a pushing operation in a direction indicated by the arrowed line a in FIG. 4B), a rod 4 held inside a shift shaft 3a of the shift lever 3 in an upwardly and downwardly movable manner is moved downwardly as indicated by the arrowed line b. Through this operation, the rod 4 is set to a shift-lock release position. Then, when the button 2 of the shift knob 1 is manually released from the push mode and moved in a direction as indicated by the arrowed line c in FIG. 4A (a push-mode releasing operation), the rod 4 is moved upwardly as indicated by the arrowed line d in FIG. A, and returned to its initial position. Through the above push release operation, the rod 4 is set to a shift-lock position.

The shift knob 1 comprises: a button base 6; a core 7 comprised of a pair of left and right half-cores 7A, 7B made of a synthetic resin and the half-cores 7A, 7B being assembled (joined) together while clamping the button base 6 from opposed lateral directions, thereby installing the button base 6 in the core 7; and an ornament (decorative member) 8 made of a synthetic resin and attached to an upper side of the core 7 (i.e. the assembled half-cores 7A, 7B) to cover the upper side of the core 7. The shift knob 1 further comprises a cover ring 9, made of a synthetic resin, attached to lower tubular portion 7a of the core 7 to cover the lower tubular portion 7a. Each of the half-cores 7A, 7B (first half-core 7A and second half-core 7B) has the lower semi-tubular portion 7a1, and a semi-bulging portion 7s1 connecting to an upper edge of the lower semi-tubular portion 7a1 and having a shape bulging outwardly with respect to the lower semi-tubular portion 7a1. The pair of the lower semi-tubular portion 7a1, 7a1 forms the lower tubular portion 7a. The pair of semi-bulging portion 7s1, 7s1 forms a bulging portion 7s.

The button base 6 has two sidewalls 6a, 6b arranged in parallel relation to each other, and a connection wall 6g connecting the sidewalls 6a, 6b together. Each of the sidewalls 6a, 6b supports a respective one of opposite ends of a pivot shaft 11 penetrating through a pivot-shaft receiving hole 2a of the button 2. The pivot shaft 11 is provided with a coil spring 12 wound therearound to bias the button 2 in a push-mode releasing direction. It is to be understood that the button 2 may be biased in a pushing direction, instead of being biased in the push-mode releasing direction as in this embodiment.

Further, for example, the sidewalls 6a, 6b of the button base 6 may be integrally molded with a pair of pivot-protrusion receiving holes, respectively. In this case, the button 2 may have a pair of pivot protrusions each formed on a respective one of opposite side surfaces thereof in such a manner as to be fittable into a respective one of the pivot-protrusion receiving holes of the button base 6, through an integral molding process. Then, each of the pivot protrusions of the button 2 is fitted into a respective one of the pivot-protrusion receiving holes of the button base 6, while bending each of the sidewalls 6a, 6b of the button base 6 outwardly, so that the button 2 is rotatably supported by the button base 6. This makes it possible to omit the pivot shaft 11. Further, the button base 6 may be integrally molded with an elastic piece for biasing the button 2 in the push-mode releasing direction or in the pushing direction. This makes it possible to omit the coil spring 12.

The button 2 has a multi-tooth (in this embodiment, 5-tooth) pinion gear 13 formed on an end thereof opposite to a side to be manually pushed, in coaxial relation to the pivot shaft 11, through an integral molding process. Alternatively, the pinion gear 13 may be formed as a separate component from the button 2. That is, in the case where a button 2 is designed while attaching importance to aesthetics, a pinion gear 13 formed separately from the button 2 while attaching importance to strength may be fixed to the button 2.

The button base 6 is provided with a guide groove 6e extending in an up-down direction. The guide groove 6e is configured to allow a convex portion 14a of a rack 14 to be fitted thereinto. The rack 14 meshed with the pinion gear 13 is supported by the guide groove 6e in an upwardly and downwardly movable manner. That is, the rack 14 is supported by the button base 6. A lower end of the rack 14 is in contact with an upper end of the rod 4.

The button 2, the pivot shaft 11, the coil spring 12 and the rack 14 are preliminarily assembled to the button base 6.

The core 7 is provided with a cutout 7t for allowing the button 2 to penetrate therethrough. Although the button 2 is installed in the core 7, a part of the button 2 is exposed to the outside through the cutout 7t.

Each of the pair of generally semi-cylindrical shaped half-cores 7A, 7B has an upper protrusion 7b and a lower protrusion 7c formed on an inner surface thereof (see FIG. 5). The upper protrusion 7b and the lower protrusion 7c are fitted, respectively, into an upper hole 6c and a lower hole 6d of a corresponding one of the sidewalls 6a, 6b of the button base 6, from a lateral direction. Further, each of a pair of top half-walls 7d, 7e of the half-cores 7A, 7B is formed with two insertion holes 7f, 7g.

Thus, when the pair of half-cores 7A, 7B are joined together from opposed lateral directions, each of two sets of the upper protrusion 7b and the lower protrusion 7c is fitted into a corresponding one of two sets of the upper hole 6c and the lower hole 6d of the button base 6. Therefore, when the button base 6 is clamped from opposed lateral directions by the pair of half-cores 7A, 7B, the button base 6 is installed in and held by the core 7 while being fixed at a given position within the core 7.

Further, when the pair of half-cores 7A, 7B are assembled together, a part of the top half-wall 7e of the right half-core 7B gets into under a part of the top half-wall 7d of the left half-core 7A, in such a manner as to allow each of the insertion holes 7f, 7g of the top half-wall 7d to be aligned with a respective one of the insertion holes 7f, 7g of the top half-wall 7e in an up-down direction.

As mentioned above, each of the half-cores 7A, 7B is formed with the lower semi-tubular portion 7a1 shaped in a semi-cylindrical shape. In the state in which the pair of half-cores 7A, 7B are joined together from opposed lateral directions, the lower semi-tubular portions 7a1, 7a1 of the half-cores 7A, 7B are assembled into a lower tubular portion 7a having a circular tubular shape. A plurality of sets of upper and lower, two, locking recesses (locking holes) 7h, 7i are formed in the lower tubular portion 7a, at approximately even angular intervals (in this embodiment, at intervals of 180 degrees) in a circumferential direction, and in a symmetrical manner with respect to an axis of the lower tubular portion 7a. The core is not necessarily formed in the pair of generally semi-cylindrical shaped half-cores 7A, 7B to be joined together from opposed lateral directions, but may be formed in an integrated cylindrical core.

The ornament 8 is formed in an upwardly-convexed generally hemispherical (arc face-like) shape, and two insertion shafts 8a, 8b are formed on a lower surface thereof. Each of the insertion shafts 8a, 8b is configured, when the ornament 8 is put on the top half-walls 7d, 7e of the core 7 in a state that the half-cores 7A, 7B are joined from opposed lateral directions, to be aligned with a corresponding one of the aligned insertion holes 7f, 7g, in an up-down direction. In this way, the insertion shafts 8a, 8b are inserted, respectively, into the aligned insertion holes 7f, 7g, so that the top half-walls 7d, 7e of the pair of half-cores 7A, 7B are retained in an inseparable manner.

The ornament 8 also has two insertion pawls 8c formed on the lower surface thereof in such a manner as to be insertable, respectively, into two slits 7j, 7k of the core 7. Then, each of the insertion pawls 8c is locked by a respective one of a pair of protrusions 6f formed, respectively, on the sidewalls 6a, 6b of the button base 6, so that the ornament 8 is attached to the core 7 while covering over the upper side of the core 7. In this operation, a coupling between corresponding ones of the insertion pawls 8c and the protrusions 6f is achieved in a snap fit manner. The snap fit means one type of mechanical joining technique for use in coupling between metal or plastic members, and a technique of fittingly coupling two members together by means of an elastic force of a material, thereby achieving fixing therebetween.

The cover ring 9 is formed in a generally cylindrical shape, and a pair of lockable protrusions 9a are formed on an inner surface thereof in such a manner as to be lockable, respectively, to the two upper locking recesses 7h of the lower semi-tubular portions 7a1 of the half-cores 7A, 7B assembled into a cylindrical shape. Each of the lockable protrusions 9a extends upwardly from a bottom wall of the cover ring 9, and has a pawl formed an upper end thereof to protrude in a lateral direction. A coupling of each of the lockable protrusion 9a to a corresponding one of the locking recess 7h is achieved in a snap fit manner. Thus, when the cover ring 9 is fitted onto an outer periphery of the lower tubular portion 7a of the core 7 from therebelow, each of the lockable protrusions 9a is locked by a respective one of the locking recesses 7h. In this way, the cover ring 9 is attached to the core 7 while covering the lower tubular portion 7a of the core 7.

The shift shaft 3a of the shift lever 3 is made of a metal, and a synthetic resin sleeve 15A is integrally formed on an outer periphery of an upper portion of the shift shaft 3a by an outsert molding process. The sleeve 15A is formed with a pair of lockable protrusions 15a lockable, respectively, to the two lower locking recesses 7i of the lower semi-tubular portions 7a1 of the half-cores 7A, 7B assembled into a cylindrical shape. Each of the lockable protrusions 15a extends downwardly, and has a pawl formed a lower end thereof to protrude in a lateral direction. A coupling of each of the lockable protrusions 15a to a corresponding one of the locking recesses 7i is achieved in a snap fit manner. Thus, when the shift shaft 3a of the shift lever 3 is inserted into an inside of the lower tubular portion 7a of the core 7 from therebelow, each of the lockable protrusions 15a is locked by a respective one of the locking recesses 7i. In this way, the lower tubular portion 7a of the core 7 is attached to the shift shaft 3a of the shift lever 3. It is to be understood that each of the upper and lower locking recesses 7h, 7i, the lockable protrusion 9a of the cover ring 9 and the lockable protrusion 15a of the shift shaft 3a is not limited to the above configuration in which two elements are provided at intervals of 180 degrees. For example, three elements may be provided at intervals of 120 degrees, or four or more elements may be provided at given intervals.

When the lower tubular portion 7a of the core 7 is attached to the shift shaft 3a of the shift lever 3 in the above manner, the lower end of the rack 14 of the button base 6 is brought into contact with the upper end of the rod 4 held inside the shift shaft 3a of the shift lever 3.

In the above button structure of the shift knob 1, according to a pushing operation of the button 2, the button is swingably moved, and thereby the pinion gear 13 is swingably moved (rotated) in a forward direction. Accordingly, the rack 14 interlocking with the movement of the pinion gear 13 is moved downwardly, and thus the rod 4 is moved downwardly to the shift-lock release position. Thus, a force during the pushing operation of the button 2 is transmitted to the rod 4 via the pinion gear 13 and the rack 14, so that it becomes possible to reduce a transmission loss of load from the pushing operation of the button 2. This allows the pushing operation of the button 2 to be performed lightly and smoothly. Therefore, operational burden on an operator or driver can be reduced.

On the other hand, when the button 2 is subjected to the push-mode releasing operation, the pinion 13 is swingably moved in a reverse direction. Thus, the rod 4 is moved upwardly from the shift-lock release position to the initial shift-lock position. In conjunction therewith, the rack 14 is moved upwardly. Thus, the button 2 is returned to the initial position.

In the above button structure of the shift knob 1, the button 2 with the pinion gear 13, the pivot shaft 11, the coil spring 12 and the rack 14 can be preliminarily installed in the button base 6 and adjusted, and this pre-installed unit can be simply installed in the core 7 of the shift knob 1, so that it becomes possible to enhance installation performance.

The pair of half-cores 7A, 7B are assembled together while clamping the button base 6 from opposed lateral directions, to install the button base 6 inside the core 7, and then the ornament 8 is attached to the upper side of the core 7 from thereabove. A coupling during the attachment is achieved in a snap fit manner. Then, the cover ring 9 is attached to the lower tubular portion 7a of the core 7 to cover the lower tubular portion 7a. A coupling during the attachment is also achieved in a snap fit manner. Subsequently, the lower tubular portion 7a of the core 7 is attached to the shift shaft 3a of the shift lever 3. A coupling during the attachment is achieved in a snap fit manner. In this way, an installation process for the shift knob 1 can be performed. As above, the shift knob 1 can be installed in a one-touch manner by an installation operation to be performed from one direction (up-down direction), so that it becomes possible to enhance the installation performance.

With reference to FIGS. 6A to 6D and FIGS. 7A and 7B, an installation structure for the shift knob 1, according to one embodiment of the present invention, will be primarily described.

FIGS. 6A to 6D and FIGS. 7A and 7B illustrate a push type structure according to one embodiment of the present invention. A fundamental structure of this embodiment has been described in connection with FIGS. 1 to 5, and therefore functions and advantages thereof will be additionally described here.

Figure 7A:
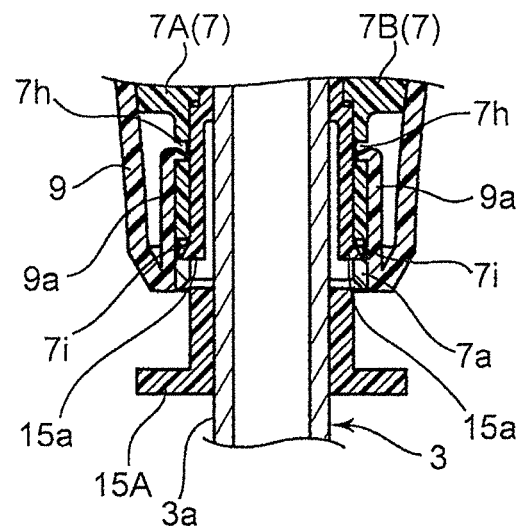
FIG. 7A is a fragmentary enlarged view of the structure in FIG. 6D.
Figure 7B:
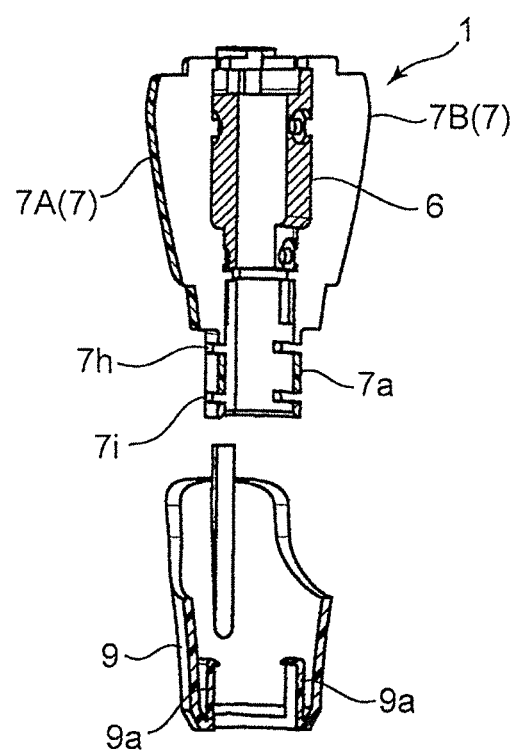
FIG. 7B is an exploded perspective sectional view of the shift knob and the cover ring in the push type structure.

FIG. 6A is a sectional view of the core 7 and the cover ring 9 in a state before the cover ring 9 is fitted onto the lower tubular portion 7a of the core 7. FIG. 6B is a sectional view of the core 7 and the cover ring 9 in a state just after the cover ring 9 is fitted onto the lower tubular portion 7a of the core 7. FIG. 6C is a sectional view of the shift shaft 3a, the core 7 and the cover ring 9 in a state before the shift shaft 3a of the shift lever 3 is inserted into the lower tubular portion 7a of the core 7. FIG. 6D is a sectional view of the shift shaft 3a, the core 7 and the cover ring 9 in a state just after the shift shaft 3a of the shift lever 3 is inserted into the lower tubular portion 7a of the core 7. FIG. 7A is a fragmentary enlarged view of the structure in FIG. 6D, and FIG. 7B is an exploded perspective sectional view of the shift knob 1 and the cover ring 9.

The shift knob 1 comprises the core 7 installing therein the button 2, and the cover ring 9 for covering the lower tubular portion 7a of the core 7. When the cover ring 9 is attached to the outer periphery of the lower tubular portion 7a of the core 7, the lockable protrusions 9a are locked, respectively, by the upper locking recesses 7h of the lower tubular portion 7a of the core 7, and thereby locked by the core 7. A coupling during this operation is achieved in a snap fit manner. Further, when the shift shaft 3a of the shift lever 3 is fitted into an inner periphery of the lower tubular portion 7a of the core 7 from therebelow, the lockable protrusions 15a of the sleeve 15A are locked, respectively, by the lower recesses 7i of the lower tubular portion 7a of the core 7, and thereby locked by the core 7. A coupling during this operation is achieved in a snap fit manner.

In this structure, when the cover ring 9 is fitted onto the outer periphery of the lower tubular portion 7a of the core 7 from therebelow, it is locked by the lower tubular portion 7a. Further, when the shift lever 3 is fitted into the inner periphery of the lower tubular portion 7a of the core 7 from therebelow, it is locked by the lower tubular portion 7a. Thus, the fitting operations are performed from one direction (up-down direction), and the coupling is achieved in a one-touch manner. That is, a shift knob installation process can be performed in such a manner that a coupling is automatically achieved only by a fitting operation without any other operation, so that it becomes possible to reduce a process time.

Further, the number of components can also be reduced, because it is possible to eliminate a need for a separate component, such as a pin, for attaching the shift knob 1 to the shift shaft 3a of the shift lever 3. In the push type structure illustrated in FIGS. 6A to 7B, the synthetic resin sleeve 15A is integrally formed on the outer periphery of the upper portion of the metal shift shaft 3a of the shift lever 3 by an outsert molding process. Thus, the lockable protrusions 15a can be provided on the shift shaft 3a. This gives rise to a question "Is it impossible to reduce the number of components (due to the sleeve 15A with pawls)?" However, the shift shaft 3a of the shift lever 3 is integrally formed with a synthetic resin support portion 18 (see FIG. 2) by an outsert molding process. The support portion 18 also serves as a swingable portion when the shift lever 3 is manually moved in front-rear and right-left directions. Therefore, by utilizing a step of outsert-molding the support portion 18, the synthetic resin sleeve 15A may be integrally outsert-molded in a simultaneous manner. This makes it possible to reduce the number of components.

FIGS. 8A to 10 illustrate a pull type structure according to one embodiment of the present invention. A fundamental structure of this embodiment has been described in connection with FIGS. 1 to 5, and therefore a different feature and functions and advantages thereof will be additionally described here.

Figure 9A:
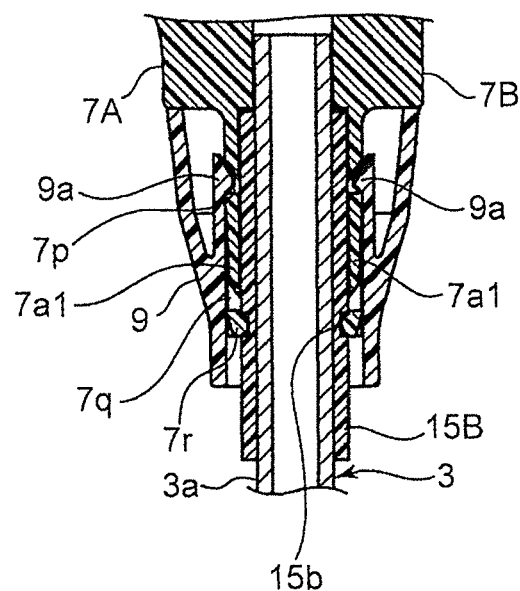
FIG. 9A is a fragmentary enlarged view of the structure in FIG. 8D.
Figure 9B:
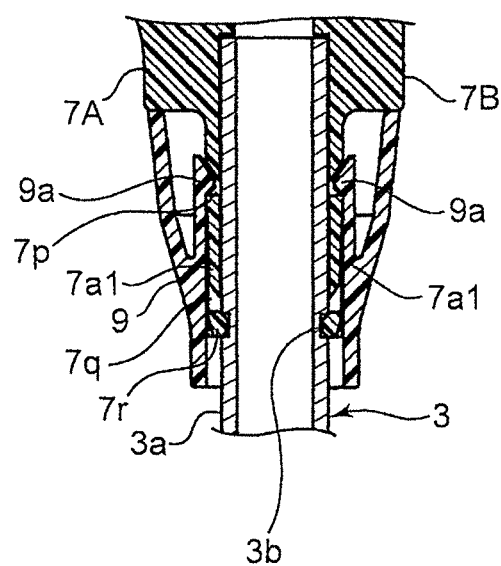
FIG. 9B is a fragmentary enlarged view of an example of modification of the structure in FIG. 9A.
Figure 10:
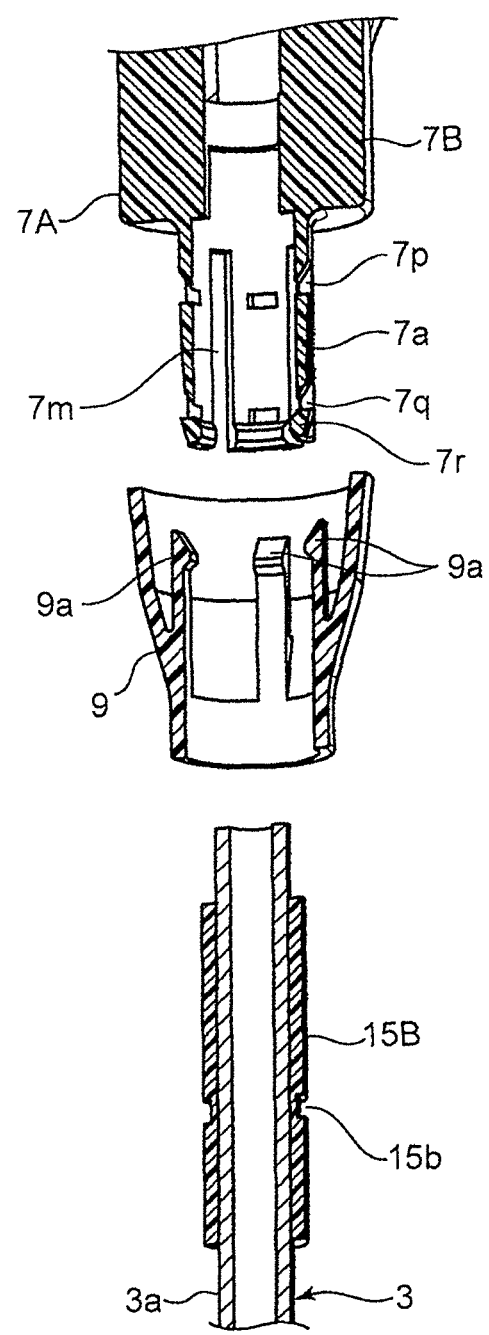
FIG. 10 is an exploded perspective sectional view of the shift knob, the cover ring and the shift shaft of the shift lever in the pull type structure.
Figure 11:
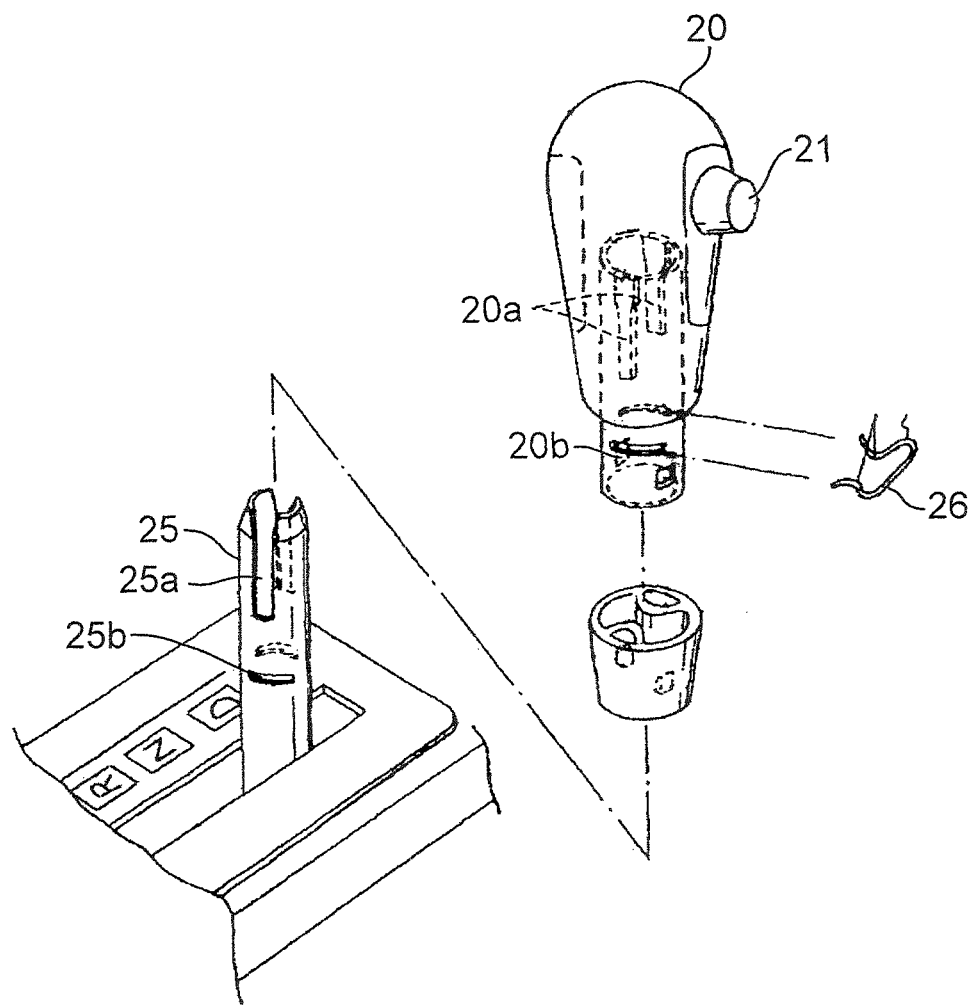
FIG. 11 is an explanatory diagram illustrating a conventional shift knob installation structure.

FIG. 8A is a sectional view of a core 7 and a cover ring 9 in a state before the cover ring 9 is fitted onto a lower tubular portion 7a of the core 7. FIG. 8B is a sectional view of a shift shaft 3a of a shift lever 3, the core 7 and the cover ring 9 in a state just after the cover ring 9 is fitted onto the lower tubular portion 7a of the core 7, and temporarily retained by an intermediate locking recess. FIG. 8C is a sectional view of the shift shaft 3a, the core 7 and the cover ring 9 in a state just after the shift lever 3 is inserted into the lower tubular portion 7a of the core 7, and temporarily locked by a lower locking protrusion. FIG. 8D is a sectional view of the shift shaft 3a, the core 7 and the cover ring 9 in a state just after the cover ring 9 is snap-fitted into an upper locking recess. FIG. 9A is a fragmentary enlarged view of the structure in FIG. 8D, and FIG. 9B is a fragmentary enlarged view of an example of modification of the structure in FIG. 9A. FIG. 10 is an exploded perspective sectional view of the shift knob, the cover ring and the shift lever.

As a feature different from those of the push type structure, the lower tubular portion 7a of the core 7 has a plurality of (in this embodiment, four) slits 7m formed at approximately even angular intervals (in the embodiment, at intervals of 90 degrees) in a circumferential direction, wherein each of the slits 7m extends from an lower end to a position close to an upper end of the lower tubular portion 7a. Further, a plurality of sets of upper, intermediate and lower, three, locking elements 7p, 7q, 7r are formed, respectively, in a plurality of regions of the lower tubular portion 7a divided by the slits 7m, in a symmetrical manner with respect to an axis of the lower tubular portion 7a. Each of the upper locking elements 7p and the intermediate locking elements 7q is a locking recess (or locking hole), and each of the lower locking elements 7r is an inwardly-oriented locking protrusion. Each of the regions of the lower tubular portion 7a divided by the slits 7m produces elasticity which allows a respective one of the lower locking elements 7r to be displaced inwardly.

Correspondingly, the cover ring 9 is formed a plurality of locking protrusions 9a each configured to be temporarily retained by a respective one of the intermediate locking recesses 7q when the cover ring 9 is fitted onto the outer periphery of the lower tubular portion 7a of the core 7 from therebelow. Each of the locking protrusions 9a extends upwardly from a lower portion of the cover ring 9, and has a pawl formed at an upper end thereof. A coupling of each of the lockable protrusions 9a to a corresponding one of the locking recesses 7q is achieved in a snap fit manner.

The shift lever 3 is formed with a lockable recess 15b configured to be locked by the lower locking protrusions 7r when the shift shaft 3a is fitted into an inside of the lower tubular portion 7a of the core 7. A coupling of each of the locking protrusions 7r to the lockable recess 15b is achieved in a snap fit manner. In place of the lockable recess 15b, a lockable hole may be formed.

The shift shaft 3a of the shift lever 3 is made of a metal, and a synthetic resin sleeve 15B is integrally formed on an upper portion of the metal shift shaft 3a by an outsert molding process. The lockable recess 15b is formed in the sleeve 15B. The lockable recess 15b is configured to be locked by the lower locking protrusions 7r of the lower tubular portion 7a of the core 7 assembled into a cylindrical shape. A coupling of each of the locking protrusions 7r to the lockable recess 15b is achieved in a snap fit manner. It is to be understood that each of the locking elements 7p, 7q, 7r of the core 7, the lockable protrusions 9a of the cover ring 9 and the lockable recess 15b of the shift lever 3 is not limited to the above configuration in which four elements are provided at intervals of 90 degrees. For example, two elements may be formed at intervals of 180 degrees, or three elements may be may be formed at intervals of 120 degrees. Alternatively, five elements may be formed at intervals of 72 degrees, or six or more elements may be formed at given intervals.

After the lockable recess 15b of the sleeve 15B of the shift lever 3 is locked by the lower locking protrusions 7r, the cover ring 9 is moved upwardly. Through this operation, the lockable protrusions 9a of the cover ring 9 are rocked, respectively, by the upper locking recesses 7p. In this way, the cover ring 9 is locked by the lower tubular portion 7a.

In this structure, the cover ring 9 is fitted onto the lower tubular portion 7a of the core 7 from therebelow. Through this operation, the lockable protrusions 9a of the cover ring 9 are temporarily locked (temporarily retained), respectively, by the intermediate locking recesses 7q of the lower tubular portion 7a of the core 7. A coupling during this operation is achieved in a snap fit manner. That is, the cover ring 9 is retained in a state in which it can be further moved upwardly. Further, the shift shaft 3a of the shift lever 3 is inserted into the inside of the lower tubular portion 7a of the core 7 from therebelow. Through this operation, the lockable recess 15b of the sleeve 15B of the shift lever 3 is locked by the lower locking protrusions 7r of the lower tubular portion 7a of the core 7. A coupling during this operation is achieved in a snap fit manner.

Then, when the cover ring 9 is further moved upwardly, the lockable protrusions 9a of the cover ring 9 are locked, respectively, by the upper locking recesses 7p of the lower tubular portion 7a of the core 7. A coupling during this operation is also achieved in a snap fit manner. The cover ring 9 is maintained in this state.

Thus, a shift knob installation process is based on a fitting operation to be performed from one direction (up-down direction), wherein the shift knob 1 can be attached to the shift shaft 3a of the shift lever 3 in a one-touch manner. Thus, it becomes possible to reduce a process time.

Further, the number of components can also be reduced, because it is possible to eliminate a need for a separate component, such as a pin, for attaching the shift knob 1 to the shift shaft 3a of the shift lever 3.

In the pull type structure illustrated in FIGS. 8A to 10, the synthetic resin sleeve 15B is integrally formed on the outer periphery of the upper portion of the metal shift shaft 3a of the shift lever 3 by an outsert molding process. Then, the lockable recess 15b (or lockable hole) is formed in the sleeve 15B. This gives rise to a question "Is it impossible to reduce the number of components (due to the sleeve 15B)?" However, the shift lever 3 is integrally formed with a synthetic resin support portion (see FIG. 2) 18 by an outsert molding process. The support portion 18 also serves as a swingable portion for allowing the shift lever 3 to be manually moved in front-rear and right-left directions. Therefore, by utilizing a step of outsert-molding the support portion 18, the synthetic resin sleeve 15A may be integrally outsert-molded in a simultaneous manner. This makes it possible to reduce the number of components.

In the pull type structure illustrated in FIGS. 8A to 10, the synthetic resin sleeve 15B is integrally formed on the outer periphery of the upper portion of the metal shift shaft 3a of the shift lever 3 by an outsert molding process, and the lockable recess 15b is formed in the sleeve 15B.

Differently, as illustrated in FIG. 9B, a lockable recess (or lockable hole) 3b may be directly formed in the metal shift shaft 3a of the shift lever 3. In this case, when the shift shaft 3a of the shift lever 3 is inserted into the inside of the lower tubular portion 7a of the core 7 from therebelow, the lower locking protrusions 7r of the lower tubular portion 7a of the core 7 are locked to the lockable recess 3b of the shift lever 3. In this operation, a coupling of each of the locking protrusions 7r to the lockable recess 3b is achieved in a snap fit manner.

In the above embodiments, a locking element (recess or protrusion) and a lockable element (protrusion or recess) are formed in one, first, component and the other, second, component, respectively. Alternatively, a lockable element (protrusion or recess) and a locking element (recess or protrusion) may be formed in the first component and the second component, respectively.

The above embodiments will be outlined below.

(1) The above embodiments disclose a structure for installing a shift knob to a shift lever in which a rod is provided in an upwardly and downwardly movable manner, wherein the shift knob comprises: a button capable of being manually pushed to allow the rod to be moved downwardly from a lock position to a lock release position according to the pushing operation; a core installing therein the button and having a lower tubular portion; and a cover ring covering the lower tubular portion of the core, and wherein the structure is configured to allow the cover ring to be fitted onto the lower tubular portion of the core from therebelow, and thereby locked by the lower tubular portion of the core in a snap fit manner, and to allow the shift lever to be inserted into the lower tubular portion of the core from therebelow, and thereby locked by the lower tubular portion of the core in a snap fit manner.

In the above embodiments, the shift knob comprises the core installing therein the button, and the cover ring covering the lower tubular portion of the core. When the cover ring is fitted onto the lower tubular portion of the core from therebelow, it is locked by the lower tubular portion in a snap fit manner. Further, when the shift lever is inserted into the lower tubular portion of the core from therebelow, it is locked by the lower tubular portion in a snap fit manner. Thus, a process of installing the shift knob to the shift lever is performed from one direction (up-down direction), and completed in a one touch manner. Thus, it becomes possible to reduce a process time. In addition, the number of components can also be reduced, because it is possible to eliminate a need for a separate component, such as a pin.

(2) The lower tubular portion of the core may be formed with an upper locking element and a lower locking element. The cover ring may be formed with a lockable element as a snap fit element configured to be locked by the upper locking element when the cover ring is fitted onto the lower tubular portion of the core from therebelow. The shift lever may be formed with a lockable element as a snap fit element configured to be locked by the lower locking element when the shift lever is inserted into the lower tubular portion of the core from therebelow.

According to this feature, when the cover ring is fitted onto the lower tubular portion of the core from therebelow, the lockable element of the cover ring is snap-fitted onto the upper locking element of the lower tubular portion of the core. Further, when the shift lever is inserted into the lower tubular portion of the core from therebelow, the lockable element of the shift lever is snap-fitted into the lower locking element of the core. Thus, the shift knob installation process is performed from one direction (up-down direction), and completed in a one touch manner. Thus, it becomes possible to reduce a process time.

(3) The lower tubular portion of the core may be formed with an upper locking element, an intermediate locking element, and a lower locking element. The cover ring may be formed with a lockable element as a snap fit element configured to be temporarily locked by the intermediate locking element when the cover ring is fitted onto the lower tubular portion of the core from therebelow. The shift lever may be formed with a lockable element as a snap fit element configured to be locked by the lower locking element when the shift lever is inserted into the lower tubular portion of the core from therebelow. The lockable element of the cover ring may be configured to be further moved upwardly from a position where the lockable element is locked by the intermediate locking element, in the state in which the lockable element of the shift lever is locked by the lower locking element, and thereby locked by the upper locking element in a snap fit manner.

According to this feature, when the cover ring is fitted onto the lower tubular portion of the core from therebelow, the lockable element of the cover ring is snap-fitted by the intermediate locking element of the lower tubular portion of the core. Further, when the shift lever is inserted into the lower tubular portion of the core from therebelow, the lockable element of the shift lever is snap-fitted by the lower locking element of the core. Then, when the cover ring is further moved upwardly, the lockable element of the cover ring is snap-fitted by the upper locking element of the lower tubular portion of the core. Thus, the shift knob installation process is performed based on a fitting operation from one direction (up-down direction), and completed in a one touch manner. Thus, it becomes possible to reduce a process time.

In the above embodiments, the shift knob installation process is performed from one direction (up-down direction), and completed in a one touch manner. Thus, it becomes possible to reduce a process time, and the number of components can also be reduced, because it is possible to eliminate a need for a separate component, such as a pin.

This application is based on Japanese Patent application No. 2012-252461 filed in Japan Patent Office on Nov. 16, 2012, the contents of which are hereby incorporated by reference. Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shifting structure comprising:
a shift lever including a shift shaft extending in a vertical direction and a rod axially movably provided in the shift shaft;
a shift knob provided on an upper end of the shift lever, the shift knob including:
 a button for moving the rod from a lock position to a lock release position and vice versa;
 a core having a tubular portion accommodating an upper end of the shift shaft and a button support portion actuatably supporting the button; and
a cover ring provided on an outside surface of the tubular portion of the core and having a hole allowing the shift shaft to pass therethrough,
wherein,
the tubular portion of the core has an upper engagement part and a lower engagement part disposed at a lower position than the upper engagement part, the lower engagement part of the tubular portion has a hollow facing inward;
the shift shaft has a sleeve that bears a lockable protrusion protruding radially out and engaging the hollow of the lower engagement part of the tubular portion of the core; and
the cover ring includes:
 a main body having a tubular shape extending in the vertical direction;
 a plurality of main body lockable protrusions disposed inside the main body, each of the main body lockable protrusions extending up from a lower end of the main body and having pawl on an upper end thereof, the pawl engaging with the upper engagement part of the tubular portion of the core, and each of the main body lockable protrusions being configured to move inward elastically.

2. A shifting structure comprising:
a shift lever including a shift shaft extending in a vertical direction and a rod axially movably provided in the shift shaft;
a shift knob provided on an upper end of the shift lever, the shift knob including:
 a button for moving the rod from a lock position to a lock release position and vice versa;
 a core having a tubular portion accommodating an upper end of the shift shaft and a button support portion actuatably supporting the button; and
a cover ring provided on an outside surface of the tubular portion of the core and having a hole allowing the shift shaft to pass therethrough,
wherein,
the tubular portion of the core has an upper engagement part and a lower engagement part disposed at a lower position than the upper engagement part;
the shift shaft has a lockable recess engaging the lower engagement part of the tubular portion of the core; and
the cover ring includes:
 a main body having a tubular shape extending in the vertical direction;
 a plurality of main body lockable protrusions disposed inside the main body, each of the main body lockable protrusions extending up from a lower end of the main body and having a pawl on an upper end thereof, the pawl engaging with the upper engagement part of the tubular portion of the core, and each of the main body lockable protrusions being configured to move inward elastically
the shift shaft has a sleeve that bears the lockable recess, with the lockable recess defining a hollow facing radially outward, and
the tubular portion has a plurality of sections arranged in a circumferential direction of the tubular portion, each of the sections of the tubular portion having an elastic property that causes a lower end thereof to move inward and each section of the tubular portion bearing:
 the upper engagement part having a hollow facing radially outward and engaging with the pawls of the main body lockable protrusions of the cover ring,
 the lower engagement part having a projection protruding radially inward and engaging with the hollow of the lockable recess, and
 a temporary engagement part that is releasably engageable with the pawls of the main body lockable protrusions of the cover ring.

* * * * *